Figure 1:
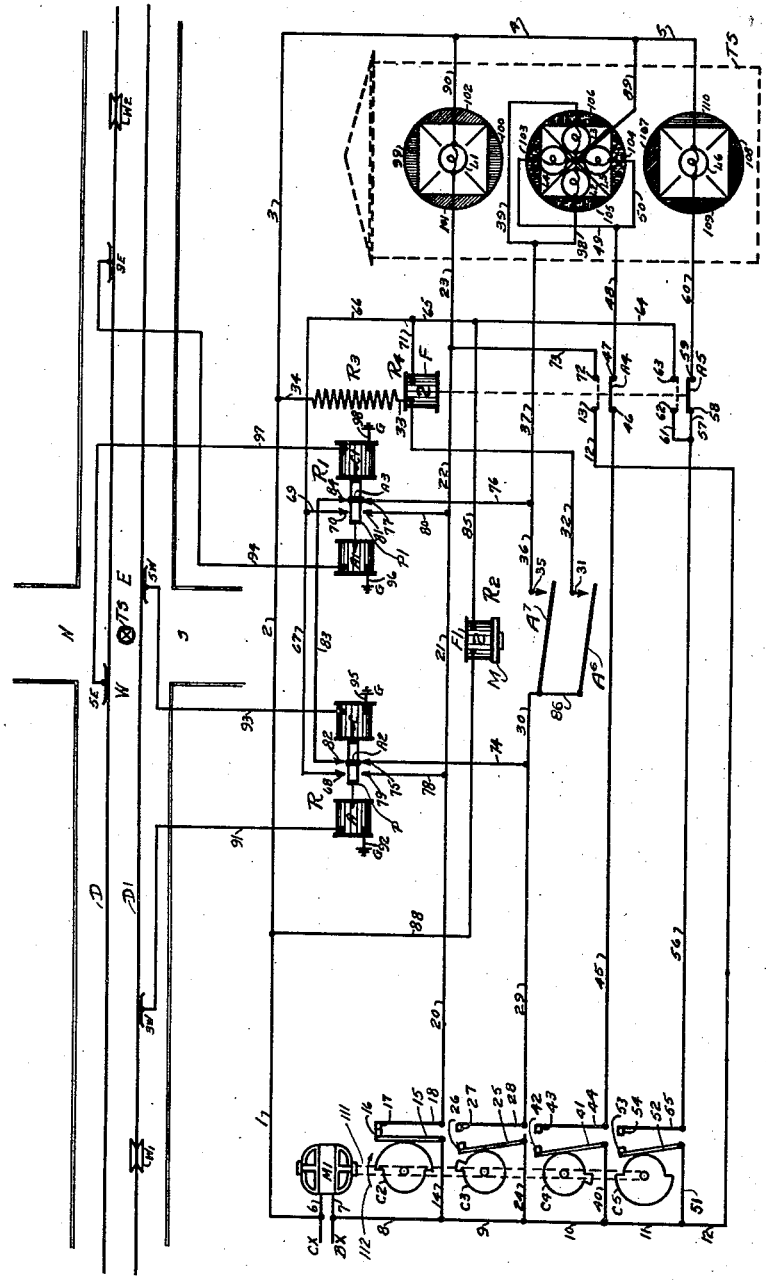

Nov. 5, 1940.           S. S. STOLP ET AL           2,220,553
          TIME ELEMENT RELEASE FOR CONTROL OF TRAFFIC SIGNALS
                      Original Filed Sept. 6, 1928
                                              2 Sheets-Sheet 1

INVENTORS.
Samuel S. Stolp
Leroy R. Wagner
BY John L. Milton
            ATTORNEY.

Nov. 5, 1940.    S. S. STOLP ET AL    2,220,553
TIME ELEMENT RELEASE FOR CONTROL OF TRAFFIC SIGNALS
Original Filed Sept. 6, 1928    2 Sheets-Sheet 2

INVENTOR.
SAMUEL S. STOLP
LEROY R. WAGNER
BY John L. Milton
ATTORNEY.

Patented Nov. 5, 1940

2,220,553

UNITED STATES PATENT OFFICE 2,220,553

TIME ELEMENT RELEASE FOR CONTROL OF TRAFFIC SIGNALS

Samuel S. Stolp, Louisville, Ky., and Le Roy R. Wagner, Detroit, Mich., assignors, by mesne assignments, to Nachod & United States Co., Incorporated, a corporation of Kentucky Application September 6, 1928, Serial No. 304,358
Renewed January 19, 1940

20 Claims. (Cl. 177—337)

Our invention relates to the control of electrically operated signals for directing the movement of traffic at the intersection of two thoroughfares.

The primary object of our invention is to provide a system wherein a vehicle approaching an intersection takes control of the display of the signal indications, and displays the proceed indication for the vehicle, so as to favor the preferential movement of the said vehicle through the intersection.

Thus, it is the object of our invention to have stop and proceed indications normally displaying alternately and repeatedly to each of the thoroughfares for predetermined times until a vehicle on one of the thoroughfares enters a certain zone with respect to the intersection, whereupon the normal times of displays of the indications is interrupted, and the proceed indication for the vehicle and the stop indication for the intersecting thoroughfare is displayed until the vehicle leaves the said zone. Therefore, with a vehicle in the said zone, the time of display of the proceed indication for the vehicle is extended beyond the time provided for the normal time of display, in the event the vehicle does not leave the said zone within the time of the normal display.

It is a further object of our invention to incorporate means in the system for interrupting the extended time of display of the proceed indication for the vehicle after a predetermined time, at which time the stop indication for the vehicle and the proceed indication for the intersecting thoroughfare is displayed for a normal period of time.

It is a still further object of our invention to construct and arrange the apparatus governing the extended time of display of the said proceed indication for the vehicle, so that the said extended time of display has a predetermined relationship with respect to the normal time of display of the indications for each thoroughfare.

Therefore, it is the object of our invention to provide an apparatus actuated in response to the approach of a vehicle to the intersection, which apparatus interrupts the normal time of display of the indications for each thoroughfare, at the expiration of the normal time of display of the proceed indication for the said vehicle, and maintains the said proceed indication displaying until the vehicle clears the intersection, and until the apparatus governing the normal time of display of the said indications subsequently operates to provide for an alteration in the display of the said indications. Accordingly, it will be apparent that our invention is particularly adaptable for controlling the time of display of signal indications at one or more intersections of the so called "wave" or "platoon" system, which, at the present time, is extensively used throughout the United States.

Figure 2:
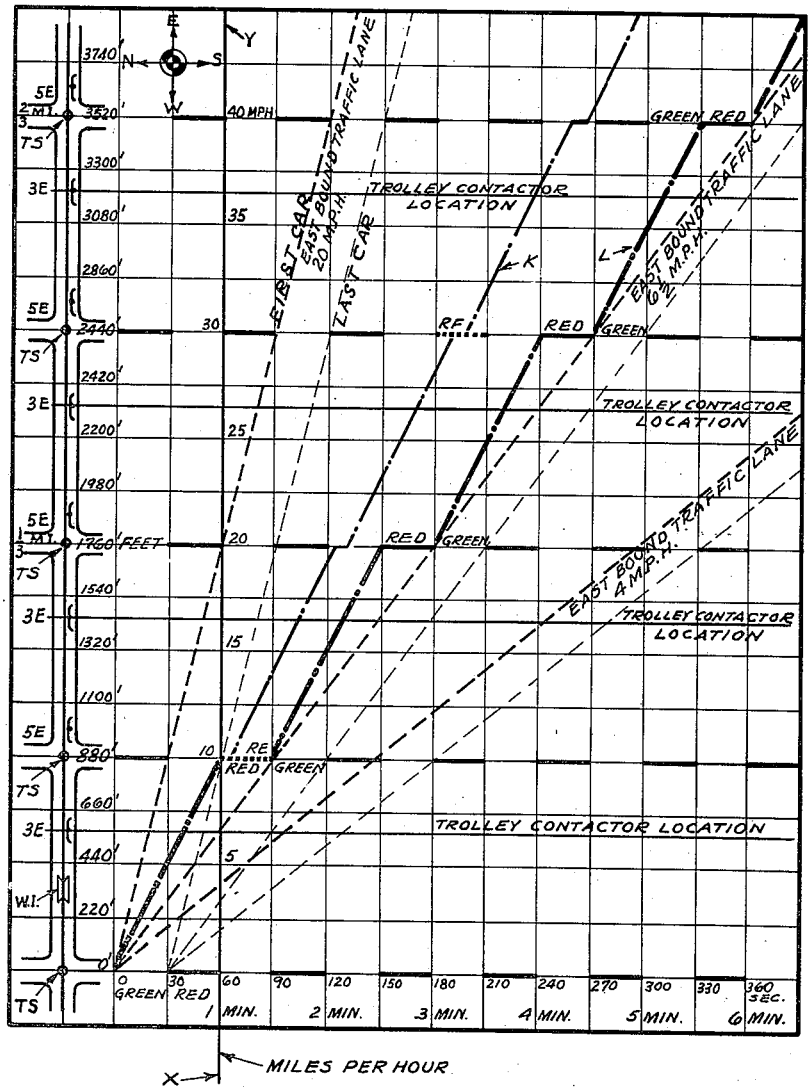

These and other objects of our invention will be more thoroughly understood as the following specification is read in connection with the accompanying drawings, in which:

Fig. 1 is a schematic circuit diagram illustrating one embodiment of our invention; and Fig. 2 is a graphic representation of a group of signals at successive intersections synchronously operated, and provided with a vehicle-actuated control of the class herein described.

Our invention is intended primarily to be actuated in response to vehicles operated by means of electrical current received from an overhead conductor via an associated current collector, although it may be actuated in response to vehicles operated by other methods.

In the system illustrated in Fig. 1, the letter D designates a trolley wire or overhead conductor for an electrically-operated trolley-car moving westbound. Positioned adjacent the trolley wire D, are trolley contactors 3E and 5E, which contactors are insulated therefrom but electrically connected thereto, when the current collector W2 engages the trolley contactors 3E and 5E respectively.

The characters D1 designate the corresponding trolley wire for the eastbound trolley car, and positioned adjacent thereto are trolley contactors 3W and 5W, which contactors are likewise insulated therefrom but electrically connected thereto when the current collector W1 engages the trolley contactors 3W and 5W respectively.

At the intersection NESW, the letters TS designate a three-indication, four-way traffic signal.

In the upper compartment, red lenses 99 and 100 face NS at the intersection, and green lenses 101 and 102 face EW, and these lenses have a common light source designated by L1.

In the center compartment, amber lenses 103, 104, 105, and 106 face NES and W respectively, and each of these lenses have individual light sources designated by L4, L3, L5 and L2 respectively.

In the lower compartment, green lenses 107 and 108 face NS at the intersection, and red lenses 109 and 110 face WE, and these lenses have a common light source designated by L6.

We also employ electrically-operated relays R and R1, which relays operate in response to the engagement of current collectors W1 and W2 with their respective trolley contactors.

Relay R is provided with two operating coils A and C, and a contact plunger P. The contact plunger P is provided with a contact ring A2 that normally engages contacts 75—82, and is brought into this position by the energization of coil C. When coil A is energized, the plunger P is shifted to the left, and contact ring A2 disengages contacts 75—82 and engages contacts 68—79.

Relay R1 is provided with two operating coils A1 and C1, and a contact plunger P1. The contact plunger P1 is provided with a similar contact ring A3 that normally engages contacts 77—84, and is brought into this position by the energization of coil C1. When the coil A1 is energized, the plunger P1 is shifted to the left, and contact ring A3 disengages contacts 77—84 and engages contacts 70—81.

We also employ an electrically-operated relay R4, which relay operates in response to the operation of relays R and R1, and the closing of certain cam-operated contacts of the motor-driven time-element device.

Relay R4 is provided with an operating coil F, and two contact bridging bars A4 and A5, which bridging bars are insulated from each other, and simultaneously operated by the energization and de-energization of coil F. Normally, coil F is de-energized, and the contact bridging bars A4 and A5 engage their respective back contacts 46—47 and 58—59. When the coil F is energized, the contact bridging bars A4 and A5 disengage their back contacts and engage their respective front contacts 13—72 and 62—63.

We also employ an electrically-operated retarded-pick-up relay R2, which relay operates in response to the operation of relays R and R1, and the closing of certain cam-operated contacts of the motor-driven time-element device.

Relay R2 is provided with an operating coil F1, and two armatures A6 and A7, which armatures are electrically connected, via wire 86, and simultaneously operated by the energization and de-energization of coil F1. The armatures of relay R2 are also provided with a retarding device M, which device delays raising of the armatures A6 and A7, until the operating coil F1 has been continuously energized for a predetermined period of time. This retarding feature may be produced by a motor-driven device, dash-pot or other similar devices well known to those skilled in the art. Normally, coil F1 is de-energized, and the armatures A6 and A7 disengage their respective front contacts 31 and 35. When the coil F1 is energized, the armatures A6 and A7 engage their respective front contacts 31 and 35, a predetermined time after the energization of coil F1. In this respect, it is to be understood that the retarding device M is constructed and arranged to require continuous energization of coil F1 in order to provide engagement of the front contacts 31 and 35 at the expiration of the said predetermined time. Thus, de-energization of coil F1, during the period of operation of the timing device M, re-sets the timing device to its starting position, and starts anew the timing of relay R4 upon subsequent re-energization of coil F1.

We also employ a motor-driven, time-element device for alternately and repeatedly displaying stop, caution and proceed indications to each of the thoroughfares for predetermined times for the control of traffic. The letter M1 designates a motor, which motor rotates cam segments C2, C3, C4 and C5 at sufficiently slow speed to provide the required timing for the display of the signal indications. Each of these cams is mounted on a common shaft 111, and rotates in the direction indicated by arrow 112. Accordingly, a further inspection of Fig. 1 will reveal that the rotation of cam segments C2, C3, C4 and C5, provides a cyclical opening and closing of associated contacts, which contacts control circuits connecting the indications of the traffic signal TS.

Normally the indications of the traffic signal display cyclically, that is, each indication displays a certain predetermined period of time before the other, all of which occurs in a definite sequence of a predetermined cycle. In the particular embodiment illustrated, the stop and proceed indications are alternately and repeatedly displayed to each of the thoroughfares for predetermined times for the control of traffic, and a caution indication is displayed on the lane receiving the proceed indication immediately preceding each alternation of the stop and proceed indications, to notify the traffic on the lane receiving the proceed indication that right-of-way will be removed from that thoroughfare.

With further reference to Fig. 1, it will be observed that cam C2, via contacts 16—17, controls the time of display of the EW proceed and NS stop indications. The circuit for the latter indications being completed from BX, through wires 8 and 14, contact-arm 15, contacts 16—17, contact-arm 18, wires 20, 21, 22 and 23, lamp L1, wires 90, 3, 2 and 1 to the return of the line CX. As illustrated, cam C2 retains contacts 16—17 in electrical engagement for one half of the time of rotation of shaft 111.

Cam C3, via contacts 26—27, controls the time of display of the EW caution indications; the circuit therefor being completed from BX, through wires 8, 9 and 24, contact arm 25, contacts 26—27, contact arm 28, wires 29 and 74, contact 75, contact ring A2, contact 82, wire 83, contact 84, contact ring A3, contact 77, wires, 76, 37, 38 and 39 to lamps L2 and L3, thence to the return of the line CX via wires 89, 4, 3, 2 and 1. As illustrated, cam C3 closes contacts 26—27 for a few seconds shortly before cam C2 disengages contacts 16—17.

Cam C4, via contacts 42—43, controls the time of display of the NS caution indications; the circuit therefor being completed from BX, through wires 8, 9, 10 and 40, contact arm 41, contacts 42—43, contact arm 44, wire 45, contact 46, bridging bar A4, contact 47, wires 48, 49 and 50 to lamps L4 and L5, thence to the return of the line CX, via wires 8, 4, 3, 2 and 1. As illustrated, cam C4 closes contacts 42—43 for a few seconds shortly before cam C5 disengages contacts 53—54.

Cam C5, via contacts 53—54, controls the time of display of the EW stop and the NS proceed indications; the circuit therefor being completed from BX, through wires 8, 9, 10, 11 and 51, contact arm 52, contacts 53—54, contact arm 55, wires 56 and 57, contact 58, bridging bar A5, contact 59, wire 60, lamp L6, wires 5, 4, 3, 2 and 1 to the return of the line CX. As illustrated, cam C5 retains contacts 53—54 in electrical engagement for one half of the time of rotation of shaft 111.

It is to be understood that cams C3 and C4 provide for the display of their respective caution indications while the corresponding proceed indication is displaying, and that each of these cams disengage their respective contacts simultaneously with the disengagement of the contacts controlled by the corresponding cams C2 and C5.

In describing the operation of our invention, an eastbound movement of a trolley car will first be taken into consideration. Thus, when the current collector W1 engages the trolley contactor 3W, coil A of relay R is energized, thereby shifting plunger P to the left and bringing contact ring A2 into engagement with contacts 68—79 and out of engagement with contacts 75—82. The circuit for energizing coil A being completed from the trolley wire D1, through the current collector W1, trolley contactor 3W, wire 91, coil A, wire 92 to ground G. As soon as the current collector disengages trolley contactor 3W, coil A is de-energized, but plunger P remains in its shifted position.

Further reference to Fig. 1 will reveal that the circuit of the EW caution indications is completed through contacts 75—82 of relay R, and that the pick-up circuit controlling the initial energization of coil F of relay R4 is completed through contacts 68—79 of relay R. It will also be observed that the operating circuit for motor M1 is directly connected to the line connections BX and CX. Therefore, the operation of the motor-driven time-element device is not affected by the aforesaid operation of plunger P of relay R. Accordingly, the display of the indications of the traffic signal TS will continue under the influence of the circuits connecting the switches operated by cams C2, C3, C4 and C5, until the cam C2 closes contacts 16—17 to display the EW proceed and NS stop indications. At this time the operating coil F of relay R4 is energized, and the bridging bars A4 and A5 disengage their respective back contacts and engage their respective front contacts. Thus, with relays R and R4 so operated, it will be observed that the circuit for the EW caution indications is opened by reason of the contact ring A2 disengaging contacts 75—82; the circuit for the NS caution indications is opened by reason of the bridging bar A4 disengaging its back contacts 46—47; and, the circuit for the NS proceed and EW stop indications is opened by reason of the bridging bar A5 disengaging its back contacts 58—59. It will also be observed that an auxiliary circuit is completed, via front contacts 13—72 and bridging bar A4, for retaining the EW proceed and NS stop indications displaying independently of the circuits controlled by the contacts of the motor-driven time element device.

As hereinbefore mentioned, the closing of contacts 68—79 of relay R, prepares the pickup circuit for coil F of relay R4 for energization, which circuit is completed when the contacts 16—17 of the motor-driven time-element device are closed. The latter circuit is completed from BX, through wires 8 and 14, contact arm 15, contacts 16—17, contact arm 18, wires 20 and 78, contact 79 of relay R, contact ring A2, contact 68, wires 67, 66 and 71, coil F, wire 33, resistance R3, wires 34, 2 and 1 to the return of the line CX. This energization of coil F, raises contact bridging bars A4 and A5 out of engagement with their respective back contacts and into engagement with their respective front contacts, as hereinbefore mentioned.

Simultaneously with the closing of contacts 53—54 by cam C5, cam C2 disengages contacts 16—17. In this respect it will be noted that contacts 53—54 normally control the circuit for the EW stop and NS proceed indications, but, as bridging bar A5 of relay R4 is out of engagement with its back contacts 58—59, the latter circuit is open, and the indications are not displayed.

The disengagement of contacts 16—17 opened the pickup circuit of coil F of relay R4. However, coil F remained energized, and the EW proceed and NS stop indications continued to display by reason of auxiliary circuits completed through contacts 13—72 of relay R4.

The circuit for retaining coil F of relay R4 energized is completed from BX, through wires 8, 9, 10, 11 and 12, contact 13 of relay R4, bridging bar A4, contact 72, wires 73, 22, 21 and 78, contact 79 of relay R, contact ring A2, contact 68, wires 67, 66, and 71, coil F of relay R4, wire 33, resistance R3, wires 34, 2 and 1 to the return of the line CX.

The circuit for continuing the display of the EW proceed and NS stop indications is completed from BX, through wires 8, 9, 10, 11 and 12, contact 13 of relay R4, bridging bar A4, contact 72, wires 73 and 23, lamp L1, wires 90, 3, 2 and 1 to the return of the line CX. Therefore, as long as coil F of relay R4 remains energized, thereby holding bridging bars A4 and A5 out of engagement with their respective back contacts and in engagement with their respective front contacts, the EW proceed and NS stop indications are maintained displaying, as hereinbefore described.

Simultaneously with the completion of the pickup circuit for coil F of relay R4, another circuit is completed for energizing coil F1 of the retarded-pickup relay R2, thereby starting the timing of this relay. The aforesaid circuit for energizing coil F1 is completed from BX, through wires 8 and 14, contact arm 15, contacts 16—17, contact arm 18, wires 20 and 78, contact 79 of relay R, contact ring A2, contact 68, wires 67, 66 and 85, coil F1 of relay R2, wires 88 and 1, to the return of the line CX.

It will be observed that coil F of relay R4, and coil F1 of relay R2 have a common electrical connection 66. Therefore, current will continue to flow through each relay coil, as long as the common electrical connection 66 is connected to the line connection BX. Thus, if a car remains between contactors 3W and 5W for a time sufficient to permit complete operation of the retarding device M of relay R2, armatures A6 and A7 will raise into engagement with their respective front contacts.

The raising of armatures A6 and A7 into engagement with their respective front contacts, prepares a circuit, via armature A7 and contact 35, for displaying the EW caution indications, and a circuit, via armature A6 and contact 31, for de-energizing coil F of relay R4, which circuits are completed when cam C3 closes contacts 26—27 of the motor-driven time-element device.

Thus, when contacts 26—27 close, the circuit for displaying the EW caution indications is completed from BX, through wires 8, 9 and 24, contact arm 25, contacts 26—27, contact arm 28, wires 29 and 30, armature A7 of relay R2, contact 35, wires 36, 37, 38 and 39 to signal lamps L2 and L3, thence to the return of the line CX, via wires 89, 4, 3, 2 and 1.

Coil F of relay R4 is de-energized simultaneously with the completion of the aforesaid circuit for displaying the EW caution indications, and this de-energization is provided by shunting coil F. In this respect, it will be observed that wire 71, connecting one terminal of coil F, is BX potential. Therefore, placing wire 32 connecting the other terminal of coil F at BX potential, shunts coil F, and thereby de-energizes same.

Referring to Fig. 1, it will be apparent that, with armature A6 in engagement with contact 31, wire 32 is placed at BX potential, when cam C3 closes contacts 26—27. The aforesaid circuit is completed from BX, through wires 8 and 9, contact arm 25, contacts 26—27, contact arm 28, wires 29, 30 and 86, armature A6, contact 31 to wire 32.

Simultaneously with the disengagement of contacts 26—27 by cam C3, cam C2 disengages contacts 16—17 and cam C5 closes contacts 53—54. The disengagement of contacts 26—27 extinguishes the EW caution indications. Likewise, the disengagement of contacts 16—17 extinguishes the EW proceed and NS stop indications, and also de-energizes the operating coil F1 of relay R2, thereby restoring the same to normal.

Accordingly, with relays R2 and R4 restored to normal, the circuits connecting the cam-operated contacts and the signal lamps are restored to normal. Therefore, the display of the signal indications is restored to normal, and the aforesaid closing of contacts 53—54 by cam C5 closes the circuit connecting lamp L6, which lamp displays the EW stop and NS proceed indications.

In the foregoing condition of operation, it was assumed that the car remained between contactors 3W and 5W sufficiently long to permit operation of the time relay R2. Therefore, relay R has not been restored to normal, and plunger P remains shifted to the left. In this condition of plunger P, it will be apparent that relay R4 will again operate when cam C2 subsequently closes contacts 16—17. Thus, as long as plunger P remains shifted to the left, relays R2 and R4 will repeatedly cooperate with the motor-driven time-element device to provide repeated extensions in the time of display of the EW proceed and NS stop indications, which extended displays are interrupted at predetermined times to provide a normal time of display of the EW stop and NS proceed indications.

Accordingly, when cam C2 subsequently recloses contacts 16—17 to provide a subsequent display of the EW proceed and NS stop indications, and the trolley car completes its movement through the intersection, current collector W1 engages trolley contactor 5W and completes the circuit for energizing coil C of relay R. The latter circuit is completed from the trolley wire D1, through the current collector W1, trolley contactor 5W, wire 93, coil C of relay R, wire 95 to ground G. Energizing coil C restores plunger P to its normal position, and thus shifts contact ring A2 out of engagement with contacts 68—79 and into engagement with contacts 82—75.

If the plunger P is restored to normal while the cam-operated contacts 16—17 are closed, the pickup circuit for coil F of relay R4 via contacts 68—79 of relay R is opened, and relay R4 immediately restores to normal.

On the other hand, if the plunger P is not restored to normal until cam C5 closes contacts 53—54, relay R4 does not restore to normal immediately, as an auxiliary retaining circuit for coil F is completed via the cam-operated contacts 53—54 and contacts 62—63 of relay R4. The auxiliary retaining circuit is completed from BX, through wires 8, 9, 10, 11 and 51, contact arm 52, contacts 53—54, contact arm 55, wires 56 and 61, contact 62 of relay R4, bridging bar A5, contact 63, wires 64, 65 and 71, coil F of relay R4, wire 33, resistance R3, wires 34, 2 and 1 to the return of the line CX. Therefore, relay R4 remains operated and the EW proceed and NS stop indications continued to display by reason of the circuit completed through contacts 13—72, which circuit was hereinbefore described in detail.

Thus, as soon as cam C5 disengages contacts 53—54, the latter mentioned auxiliary retaining circuit for coil L is opened, and relay R4 immediately restores to normal. Restoring relay R4 to normal, restores the normal operation of the signals via the cam-operated contacts and associated circuits connecting the various signal lamps.

It is to be noted, that wires 64, 65, 66, 67, 69, 71 and 85 are relatively of the same potential. Therefore, whenever these wires are connected to BX, via the various circuits controlled by the cam-operated contacts and contacts of relays R, R1 and R4, the operating coils F and F1 of relays R4 and R2, respectively, are each energized.

From the foregoing it will be evident that relay R4 is controlled jointly by the motor-driven time-element device and one of the relays R or R1, and that the contacts of relay R4 are interposed in the circuits connecting the motor-driven time-element device and signal indications, for extending the time of display of the EW proceed and NS stop indications beyond the time normally determined by the motor-driven time-element device. It will also be evident that relay R2 begins its timing simultaneously with the operation of relay R2, for interrupting the extended time of display of the said indications after a predetermined time.

In the latter description only the movement of a car eastbound was taken into consideration, and the relay R, under the control of contactors 3W and 5W, operated, but it is to be understood that the system will function similarly for a westbound car movement operating relay R1, via contactors 3E and 5E.

As particularly pointed out in the preceding description, the extended time of display of the EW proceed and NS stop indications does not disturb the cyclic operation of motor M and its associated cams C2, C3, C4 and C5, since the motor driven time-element device continues to operate while relay R4 is providing the said extended time of display. In this respect, it is well known to those skilled in the art that the indications of a plurality of successive intersections can be operated in synchronism by adjusting each motor-driven time-element device for the same total time cycle with the time of display of each stop and proceed indication correspondingly regulated. Therefore, our invention has particular application to such synchronously operated systems, since the synchronous relation of the indications is not disturbed, but the display of a stop indication suppressed to extend correspondingly the time of display of the proceed indication. This application of our invention is illustrated in Figure 2.

In Fig. 2, the timing of a group of signals operating synchronously is graphically represented. For simplicity, the railway car and vehicular traffic on the EW thoroughfare are considered in one direction only, namely, eastbound. In the diagram, cross streets intersect the EW thorougfare at 880 foot intervals, and the timing of the traffic signals is arranged so that a vehicle traveling at a speed equivalent to 20 M. P. H. can travel in a traffic channel thirty seconds wide, and receive a proceed indication at each intersection.

This system of synchronous traffic control is widely used at the present time, and is known as the "wave" or "platoon" system. As well known to those versed in the art, a system timed for a certain speed has other channels in which traffic may move at other speeds and always receive a proceed indication. The usable channels always have a speed less than that of the maximum arranged speed, and, in this particular instance, are 6½ M. P. H. and 4 M. P. H., respectively.

For convenience, the 60 second line XY of the graph has been calibrated in M. P. H. so that all lines intersecting this line, and extending from the zero point, indicate the relative speed represented by that line. It will be noted that a vehicle moving at a speed other than a synchronous speed receives stop indications at most of the intersections, or all of them, depending upon the rate of speed of the vehicle.

This is very detrimental in the use of this type of signaling, especially during the peak operating periods of railway cars, since, during these peak periods, the average speed of a railway car is considerably reduced, and, by reason of unnecessarily long stopping times, "traffic stagnation" of vehicles following the car usually results. Therefore, as the car continues its course of travel through the signaled area, a considerable accumulation of "bottled" traffic in the rear of the railway car results.

In the graph, the heavy dot-dash lines L represent a railway car starting at the beginning of the system, traveling at a speed less than the maximum synchronous speed, and arriving at the beginning of the display of the stop indication at each intersection. At each of these intersections the railway car is compelled to make a long objectionable stop, and thereby unnecessarily interfere with the movement of vehicular traffic on the EW highway. From the latter it will be apparent that, if the signal controls at the several intersections were each equipped with a relay system interposed between the automatic cyclic controller and right of way indicating device, to interrupt the cyclic control of the signal indications in the manner hereinbefore described, such long objectionable stops would be eliminated, and the "bottled" traffic would be greatly reduced. This, in effect, is the same as opening an intermediate traffic channel in the system.

On the graph, the medium dot-dash lines K indicate the travel of the railway car in an intermediate traffic channel produced by a relay system controlling the traffic signal indications in accordance with the movement of the railway car. It can be seen that the car moves, for the first block, in a line corresponding with L, and, instead of receiving the usual stop indication, at the second intersection receives a proceed indication, since the time of display of the proceed indication at this intersection is extended, and the stop indication removed, as represented by the heavy dotted line in Fig. 2.

It must be understood that extending the time of display of the proceed indication, at any one intersection, does not interfere with the cyclic display of the indications at the other intersections, as each intersection is provided with an independent relay system, right-of-way indicating device and cyclic controlling means.

Thus, the railway car, after making a stop, is enabled to start immediately and clear the second intersection on the extended time of display of the proceed indication, and, if the car continues at the same rate of speed, it will clear the third intersection within the normal time of display of the proceed indication at this intersection, and the normal operation of the signal indications at the third intersection will not be disturbed.

However, at the fourth intersection, the car would have received a red indication, but with the use of a similar relay system at this location, the time of display of the proceed indication is likewise extended and the stop indication removed as represented by the heavy dotted line in Fig. 2.

It can be seen that the intermediate channel K, formed by the railway car controlling the display of the signal indications, can vary over wide limits, and is governed entirely by the speed of the railway car. For instance, if the railway car is traveling at a relatively fast rate of speed, the intermediate channel will shift in the direction of the maximum traffic channel. Likewise, if the railway car is moving at a slower rate of speed, the intermediate channel will shift in the direction of the slower traffic channels, and, through these wide limits, the railway car will always establish the auxiliary traffic channel K to suit the relative speed of the railway car. In addition to the saving of time for the railway car, which by far handles the greatest percentage of traffic, it will relieve traffic congestion that would have ordinarily occurred if the railway car was compelled to stop at each of the intersections.

It must be understood that, at each of the intersections, the conventional form of traffic signal is employed, using red, amber and green signal indications, alternately displaying for predetermined times to the main and cross thoroughfares. For simplicity, only the stop and proceed indications for the EW highway were considered. It must also be understood that the control system shown in Fig. 1 is a typical representation of the equipment employed at each of the intersections.

The cyclic controlling device at each intersection usually employs a synchronous motor for controlling the cam-operated contacts, and it is well known to those skilled in the art that such devices, when connected to the same source of power, will maintain a definite relation established between the various cyclic controllers. Frequently, an auxiliary device is employed to assure a synchronous relation between the various cyclic controllers, but, since this device does not have a direct bearing on the operation of our invention, it has been omitted.

Having thus described our invention, we claim:

1. In a traffic signalling system for interfering traffic lanes including means for displaying right of way indications, a constantly operating device, controller means driven by the constantly operating device, circuit connections between the said controller and the right of way indicating device, for normally cyclically shifting said right of way indication from one lane to another, means affected by a vehicle approaching the intersection on one lane to temporarily interrupt the normal cyclic display of the said right of way indications and prolong the display of the right of way indication on the said one lane, and a second means operable a predetermined time thereafter to restore the normal cyclic display of said right of way indications to said controller.

2. A traffic signaling system arranged at the intersection of a main highway and a crossroad for regulating traffic, said system including a highway signal lamp circuit and a crossroad signal lamp circuit, a time controlled switch means normally associated with the said circuits for normally cyclically opening and closing same to alternately and repeatedly display said signal lamps, relay means controlled by the said time switch means and by a vehicle on the main highway approaching the intersection, for maintaining the display of the said highway signal lamp, and means operable by the said vehicle after clearing the intersection to restore the normal cyclical display of the said signal lamps to the time controlled switch means, and a second relay means provided with a time element factor operable after a predetermined time to restore the normal cyclic display of the said signal lamps by the said time controlled switch means.

3. A traffic signaling system arranged at the intersection of a main highway and a crossroad for regulating traffic, said system including a highway signal lamp circuit and a crossroad signal lamp circuit, a time controlled switch means associated with the said circuits for normally cyclically opening and closing same to alternately and repeatedly display said signal lamps, vehicular actuated means for the main highway operable to one position when a vehicle enters a certain zone with respect to the said intersection and to a second position when the vehicle clears the said intersection, and relay means controlled jointly by the said vehicle means and time controlled switch, means to interrupt the control of said circuits by the time controlled switch means and to maintain the display of the said highway signal lamp for the main highway when the said vehicular actuated means is in the first mentioned position, and a second relay means provided with a time element factor operable after a predetermined time to restore the normal cyclic display of the said signal lamps by the controller.

4. A traffic signaling system arranged at the intersection of a main highway and a crossroad for regulating traffic, said system including a highway signal lamp circuit and a crossroad signal lamp circuit, a time controlled switch means normally associated with the said circuits for alternately cyclically opening and closing same to alternately and repeatedly display said signal lamps, traffic responsive means actuated by a vehicle on the main highway approaching the intersection and upon clearing the said intersection, relay means having contacts interposed in the said signal lamp circuits, said relay means controlled jointly by the traffic responsive means and time controlled switch means to interrupt the control of said circuits by the said time controlled switch means to maintain the display of the highway signal lamp when the said traffic responsive means is actuated by a vehicle approaching the said intersection and to restore the control to the said time controlled switch means when the said traffic responsive means is actuated by a vehicle clearing the intersection, and a second relay means provided with a time element factor operable after a predetermined time to restore the normal cyclic display of the said signal lamps by the controller.

5. A right-of-way indicating device for interfering traffic lanes; a constantly operating device, a controller means driven by the constantly operating device; circuit connections between the said controller and right-of-way indicating device for normally cyclically shifting right-of-way from one traffic lane to the other; other circuit connections to said right-of-way indicating device for a constant display of the right-of-way to one of said traffic lanes, relay means activated by a vehicle for shifting from the first named circuit connection to the second named circuit connections whereby the normal cyclic display of the right-of-way is interrupted and the right-of-way to the last said traffic lane is maintained, and a second relay means operable a predetermined time after activation of the first named relay means to restore the normal cyclic display of the right-of-way.

6. A right-of-way indicating device for interfering traffic lanes; a constantly operating device, a controller means driven by the constantly operating device; circuit connections between the said controller and right-of-way indicating device, for normally cyclically shifting right-of-way from one traffic lane to the other, other circuit connections to said right-of-way indicating device for a constant display of the right-of-way to one of said traffic lanes, relay means activated by a vehicle for shifting from the first named circuit connection to the second named circuit connections whereby the normal cyclic display of the right-of-way is interrupted and the right-of-way to the last said traffic lane is maintained, and a second relay means operable a predetermined time after activation of the first named relay means to restore the normal cyclic display of the right-of-way and means affected by the vehicle for restoring the said first and second relay means to normal.

7. A traffic signaling system for regulating traffic on interfering traffic lanes, said system including a right-of-way indicating device for each of the said traffic lanes, a constantly operating device, a controller means driven by the constantly operating device; circuit connections between the said controller and right-of-way indicating devices, for normally cyclically shifting right-of-way from one traffic lane to the other, means affected by a vehicle approaching the right-of-way indicating device on one of the said traffic lanes to temporarily interrupt the normal cyclic display of the right-of-way and prolong the energization of the right-of-way on the last said traffic lane, and a second means provided with a time element factor operable after a predetermined time to restore the normal cyclic display of the right-of-way to the said controller.

8. A traffic signaling system for regulating traffic on interfering traffic lanes, said system including a right-of-way indicating device for each of the said traffic lanes, a constantly operating device, a controller means driven by the constantly operating device; circuit connections between the said controller and right-of-way indicating devices, for normally cyclically shifting right-of-way from one traffic lane to the other, means affected by a vehicle approaching the right-of-way indicating device on one of the said traffic lanes to temporarily interrupt the normal cyclic display of the right-of-way and prolong the energization of the right-of-way on the last said traffic lane, and a second means provided with a time element factor operable after a predetermined time to restore the normal cyclic display of the right-of-way to the said controller, and means affected by the said vehicle for restoring the said first and second means to normal.

9. In a traffic control system which comprises a plurality of signal stations, each station including a right-of-way indicating device and a constantly operating device therefor for normally cyclically shifting right-of-way from one thoroughfare to the other in synchronism with the operation of the remaining signal stations of the system; one of said signal stations including an electrically operated right-of-way indicating device for the main and cross thoroughfares at said station, a controller means driven by the constantly operating device at the said signal station, circuit connections between said controller and the right-of-way indicating device; a traffic responsive means for said main thoroughfare having one condition of operation when traffic on said thoroughfare is approaching said intersection and is within a certain distance thereof, and a second condition of operation for all other positions of traffic on said thoroughfare with respect to said intersection, and relay means controlled jointly by the traffic responsive means and the controller means, and having contacts interposed in said circuits between said right-of-way indicating device and said controller for interrupting the normal cyclic display of the right-of-way and for constantly displaying the right-of-way to said main thoroughfare when said traffic responsive means is in said first condition of operation and for restoring the cyclic control by the controller means when in said second condition and a second relay means controlled jointly by the said traffic responsive means and controller for restoring the normal cyclic control by the controller when the said traffic responsive means is being maintained in the first said condition of operation.

10. In a traffic signaling device; an electrically operated right-of-way indicating device for main and cross thoroughfares; a constantly operating device; a controller means driven by the constantly operating device; circuit connections between said controller and right-of-way indicating device, for normally cyclically shifting right-of-way from one thoroughfare to the other; a traffic responsive means for said main thoroughfare having one condition of operation when traffic on said thoroughfare is approaching said intersection and is within a certain distance thereof; and a second condition of operation for all other positions of traffic on said thoroughfare with respect to said intersection; and relay means controlled jointly by the traffic responsive means and the controller means and having contacts interposed in the circuit between the right-of-way indicating device and the controller; for interrupting the normal cyclic display of the right-of-way and for constantly displaying the right-of-way to said main thoroughfare when said traffic responsive means is in first condition of operation and for restoring the normal cyclic control by the controller means when the traffic responsive means is in said second condition, and a second relay means controlled jointly by the said traffic responsive means and controller for restoring the normal cyclic control by the controller when the said traffic responsive means is being maintained in the first said condition of operation.

11. In an apparatus of the class described; a right of way indicating device for main and cross thoroughfares, a constantly operating device, a controller means driven by the constantly operating device; circuit connections between the said controller and right of way indicating device, for normally cyclically shifting a right of way indication from one thoroughfare to the other, other circuit connections to said right-of-way indicating device for a constant display of the right-of-way indication to said main thoroughfare, relay means activated by a vehicle for shifting from the first named circuit connections to the second named circuit connections whereby the normal cyclic display of the right-of-way indications is interrupted and the right-of-way indication to the main highway is maintained, and a second relay means operable a predetermined time after activation of the first named relay means to restore the normal cyclic display of the right-of-way indications.

12. A traffic signaling system arranged at the intersection of a main highway and a cross road for regulating traffic, said system including a main highway right of way indication and a crossroad right of way indication, a constantly operating device, a controller means driven by the constantly operating device; circuit connections between the said controller and said right of way indications, for normally cyclically shifting right of way from one thoroughfare to the other, means affected by a vehicle approaching the intersection on the main highway to temporarily interrupt the normal cyclic display of the said right of way and to prolong the energization of the said main highway right of way indication, and a second means provided with a time element factor operable after a predetermined time to restore the normal cyclic display of the said right of way indications to the said controller.

13. In a traffic control system which comprises a plurality of signal stations, each station including a right of way indicating device and a constantly operating device therefor for normally cyclically shifting right of way from one thoroughfare to the other in synchronism with the operation of the remaining signal stations of the system; one of said signal stations including an electrically operated right of way indicating device for the main and cross thoroughfares at said station, a controller means driven by the constantly operating device at the said signal station, circuit connections between said controller and the right of way indicating device; a traffic responsive means for said main thoroughfare having one condition of operation when traffic on said thoroughfare is approaching said intersection and is within a certain distance thereof, and a second condition of operation for all other positions of traffic on said thoroughfare with respect to said intersection, and relay means controlled jointly by the traffic responsive means and the controller means, and having contacts interposed in said circuits between said right of way indicating device and said controller for interrupting the normal cyclic display of the right of way and for constantly displaying the right of way to said main thoroughfare when said traffic responsive means is in said first condition of operation and for restoring the cyclic control by the controller means when in said second condition and a second relay means provided with a time element factor controlled jointly by the said traffic responsive means and controller for restoring the normal cyclic control by the controller when the said traffic responsive means is being maintained in the first said condition of operation.

14. In a traffic signaling device; an electrically operated right of way indicating device for main and cross thoroughfares; a constantly operating device; a controller means driven by the constantly operating device; circuit connections between said controller and the right of way indicating device, for normally cyclically shifting right of way from one thoroughfare to the other; a traffic responsive means for said main thoroughfare having one condition of operation when traffic on said thoroughfare is approaching said intersection and is within a certain distance thereof; and a second condition of operation for all other positions of traffic on said thoroughfare with respect to said intersection; and relay means controlled jointly by the traffic responsive means and the controller means and having contacts interposed in the circuit between said right of way indicating device and the controller; for interrupting the normal cyclic display of the right of way and for constantly displaying the right of way to said main thoroughfare when said traffic responsive means is in said first condition of operation and for restoring the normal cyclic control by the controller means when the traffic responsive means is in said second condition; and a second relay means provided with a time element factor controlled jointly by the said traffic responsive means and controller for restoring the normal cyclic control by the controller when the said traffic responsive means is being maintained in the first said condition of operation.

15. In a traffic signaling system for interfering traffic lanes, a right-of-way indication; means normally displaying said indication to each of said lanes for predetermined times for the control of traffic; a vehicle-actuated device in one of said lanes; means, operating in response to an actuation of the said device and cooperating with the first named means when the said indication is displaying to the said one lane, for extending the time of display of said indication to the said one lane beyond the time normally predetermined by the first named means; and means operating after a predetermined time; for restoring the normal display of the said indication by the first named means.

16. In a traffic signaling system for interfering traffic lanes, a right-of-way indication; means normally displaying said indication to each of said lanes for predetermined times for the control of traffic; a vehicle-actuated device in one of said lanes; means, operating in response to an actuation of the said device and cooperating with the first named means when the said indication is displaying to the said one lane, for extending the time of display of the said indication to the said one lane beyond the time normally predetermined by the first named means; and means operable a predetermined time thereafter, for restoring the normal display of the said indication by the first named means.

17. In a traffic signaling system for interfering traffic lanes, a right-of-way indication; means normally displaying said indication to each of said lanes for predetermined times for the control of traffic; a vehicle-actuated device in one of said lanes; control means operating in response to an actuation of the said device and cooperating with the first named means when the said indication is displaying to the said one lane, for extending the time of display of the said indication to the said one lane beyond the time normally predetermined by the first named means; and means, operating a predetermined time after the operation of the said control means, for restoring the normal display of the said indication by the first named means.

18. In a traffic signaling system for interfering traffic lanes, a right-of-way indication; timer means normally displaying said indication to each of said lanes for predetermined times for the control of traffic; a vehicle-actuated device in one of said lanes; control means, operating in response to an actuation of said device, for rendering the said timer means ineffective to display normally the said indication, and for displaying said indication to the said one lane; and means, operating a predetermined time after the operation of the said control means, for rendering said timer means effective to display normally the said indication.

19. In a traffic signaling system for interfering traffic lanes, a right-of-way indication; means normally displaying said indication to each of said lanes for predetermined times for the control of traffic; a vehicle-actuated device in one of said lanes; control means operating in response to an actuation of the said device when the said indication is displaying to the said one lane, for rendering the first named means ineffective to display normally the said indication and for maintaining the said indication displaying on the said one lane; and timer means, operating a predetermined time after the operation of the said control means, for rendering the said first named means effective to display normally the said indication.

20. In a traffic signaling system for interfering traffic lanes, a right-of-way indication; means normally displaying said indications to each of said lanes for predetermined times for the control of traffic; a vehicle-actuated device in one of said lanes; and means, operating in response to an actuation of the said device when the said indication is displaying to the said one lane, for rendering the first named means ineffective to display normally the said indication, and for maintaining the said indication displaying on the said one lane for a predetermined time beyond the time determined by the first named means.

SAMUEL S. STOLP.
LE ROY R. WAGNER.